Nov. 6, 1945.  K. K. PALUEV  2,388,565
ELECTRIC APPARATUS
Filed May 16, 1942  5 Sheets-Sheet 1

Inventor:
Konstantin K. Paluev,
by Harry E. Dunham
His Attorney.

Nov. 6, 1945.    K. K. PALUEV    2,388,565
ELECTRIC APPARATUS
Filed May 16, 1942    5 Sheets-Sheet 3

Inventor:
Konstantin K. Paluev,
by Harry E. Dunham
His Attorney.

Nov. 6, 1945.  K. K. PALUEV  2,388,565
ELECTRIC APPARATUS
Filed May 16, 1942  5 Sheets-Sheet 4

Inventor:
Konstantin K. Paluev,
by Harry E. Dunham
His Attorney.

Patented Nov. 6, 1945

2,388,565

UNITED STATES PATENT OFFICE 2,388,565

ELECTRIC APPARATUS

Konstantin K. Paluev, Pittsfield, Mass., assignor to General Electric Company, a corporation of New York Application May 16, 1942, Serial No. 443,310

16 Claims. (Cl. 175—361)

My invention relates to electric apparatus and to a structure for facilitating the cooling thereof, and although not limited thereto it has particular application to transformers.

It has been appreciated, in a general way, that the thermal efficiency of electrical apparatus, such as transformers may be improved by forcing the circulation of an insulating or cooling fluid over the transformer structure in order to remove heat due to the losses. However, it has been common practice to manufacture transformers with tanks having vertical cooling tubes connected to the top and bottom of the transformer casing, and to depend upon convection currents to circulate the fluid over the transformer structure and through the cooling tubes to maintain the degree rise in temperature below an accepted maximum value, or to force the fluid through the conventional structure. Thus, with the advance in the electrical industry there is presented a problem of producing a practical, economical, and efficient structure which is not only designed for forced cooling, but which will have a high space factor and a resulting structure in which there is structural harmony with respect to electrical, mechanical and thermal considerations.

It is, therefore, an object of my invention to provide an improved structure for an electrical apparatus for facilitating the circulation of an insulating fluid through the apparatus.

Another object of my invention is to provide an electrical apparatus with an improved structure so as to improve the economy thereof and substantially decrease the size thereof over apparatus of previous constructions having the same capacity.

A further object of my invention is to provide the winding structure with an improved duct system which will allow a forced circulated fluid to remove the heat from the windings at a relatively rapid rate.

A still further object of my invention is to provide a transformer structure with an enclosing tank which will allow an insulating fluid to be continuously circulated from an intake port in the tank through the transformer structure into an exit opening in the tank structure in an improved manner.

A still further object of my invention is to provide an improved core and coil clamping arrangement for an electrical apparatus.

Further objects and advantages of my invention will become apparent from the following description referring to the accompanying drawings, and the features of novelty which characterize my invention will be pointed out with particularity in the claims annexed to and forming a part of this specification.

In the arrangements illustrated in the drawings, I have provided an improved structure for directing the flow of an insulating or cooling fluid over a winding structure or over a portion of the surfaces of the winding to conduct heat therefrom and although my invention finds efficient application to transformers it is to be understood that it also has application to any other suitable type of electrical apparatus. Also, I have shown my invention as employed with a transformer having an enclosing casing, but it is to be understood that features of my invention may be employed with other types of structures, such as air-cooled transformers having an open casing.

Figure 1:
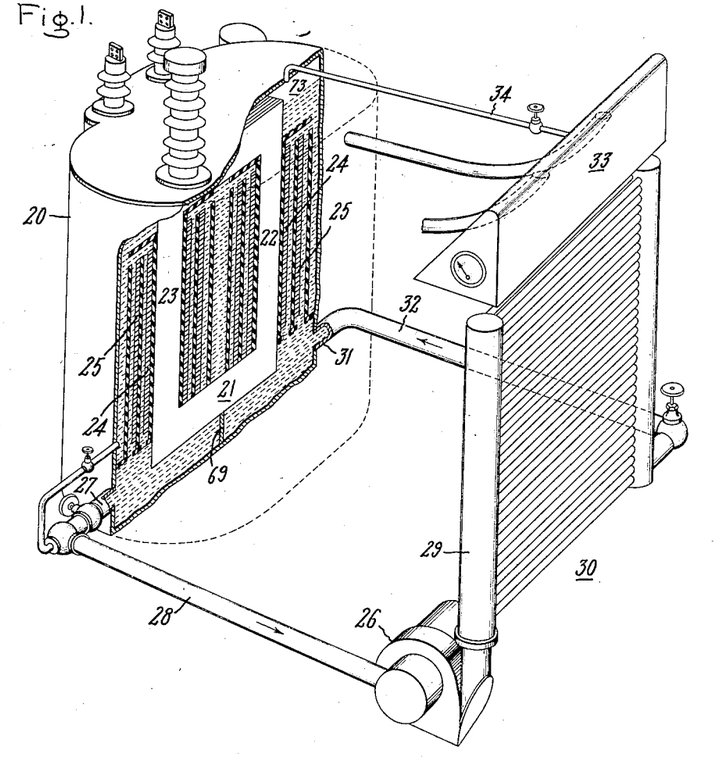
Fig. 1 is a perspective view, partially diagrammatic and in partial section, of a transformer and fluid system therefor, the transformer structure being provided with an embodiment of my invention.

Referring to Fig. 1 of the drawings, I have illustrated a transformer and fluid system therefor including a tank 20 having a core structure 21 with winding legs 22 and 23. Windings, such as a low voltage winding 24 and a high voltage winding 25 surround both the winding legs and a suitable insulating fluid may be provided in the tank, such as mineral oil or a suitable chlorinated hydrocarbon such as for example, the liquid described in Clark Patent 1,931,373, issued October 17, 1933, and which is assigned to the same assignee as this present invention. In order to provide for forced circulation of the fluid through the transformer tank, there is provided a pump 26 of any suitable type, the intake side of which is connected to a port 27 in the transformer casing through a pipe 28. The pump 26 exhausts into a header 29 of a heat exchanger 30, the exhaust end of the heat exchanger being connected to a port 31 in the tank through a pipe 32. A conservator or expansion chamber 33 is provided which is fluidly connected to the top of the tank 20 through a pipe 34. Such a transformer system with a substantially hermetically sealed fluid system and an improved arrangement for maintaining the degree of purity of the insulation and fluid dielectric and for maintaining the fluid pressure of the system within predetermined limits is described and claimed in my copending application Serial No. 420,943, filed November 29, 1941, which issued as Patent 2,341,058 on February 8, 1944, and which is assigned to the same assignee as the present invention.

As has already been stated, it has been generally appreciated that the thermal efficiency of an electrical apparatus, such as a transformer may be improved by forcing a fluid dielectric through the transformer structure in order to increase the rate of heat transfer from the transformer structure to the fluid. I have found, however, that when a fluid is directed through a winding structure in a manner which will be described below, the efficiency of the resulting transformer structure is unexpectedly improved.

Figure 2:
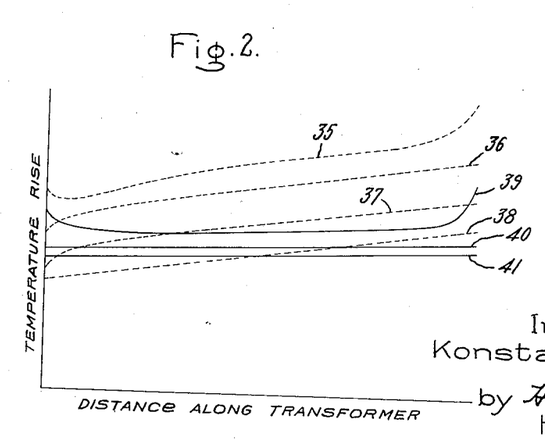
Fig. 2 illustrates curves which will be used in explaining thermal results of my invention.

Referring to Fig. 2 of the drawings, I have illustrated this unexpected improvement by showing the relative relationships between the temperatures of the various parts of the transformer system of my improved structure, as compared with that of previous constructions. Thus, the distance from the bottom of the transformer structure to the top is plotted as abscissa and the temperature rise over ambient temperature is plotted as ordinate. The dotted lines illustrate temperatures for prior constructions, while the full lines illustrate the temperatures in a construction made according to my invention and having substantially the same kva. capacity. Curve 35 represents the temperature of the copper from the bottom of windings to the top, while curve 36 represents the temperature of the outside insulation of the coils of the conventional transformer. Curve 37 represents the temperature of the fluid in the casing surrounding the windings of the conventional structure, while curve 38 represents the temperature of the radiator. The relative temperatures, however, of a transformer of similar kva. capacity and manufactured according to my invention, are shown by the full line curves, and curve 39 represents the temperature of the copper, and curve 40 represents the temperature of the outside insulation. Curve 41 represents the temperature of the fluid dielectric in the heat exchanger when fluid that is forced through the transformer casing is directed over the winding according to a feature of my invention. It will, therefore, be seen that with a transformer manufactured according to my invention, not only is the average temperature of the various parts of the transformer structure and the winding hot spot lowered over that of prior constructions having equivalent kva. capacity, but the temperature changes from the bottom to the top of the transformer structure are considerably less with my improved structure than with prior constructions. It will also be noted that this is accomplished with similar average cooler temperatures.

Figure 3:
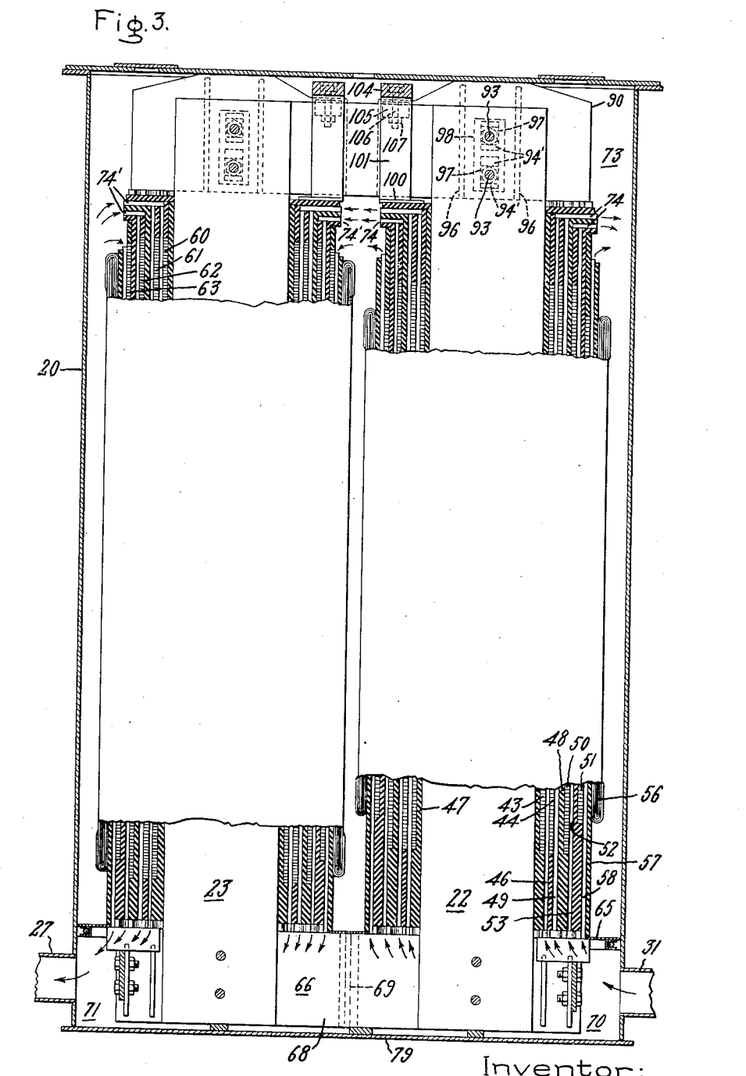
Fig. 3 is a side elevation in partial section of a modification of the transformer illustrated in Fig. 1.
Figure 4:
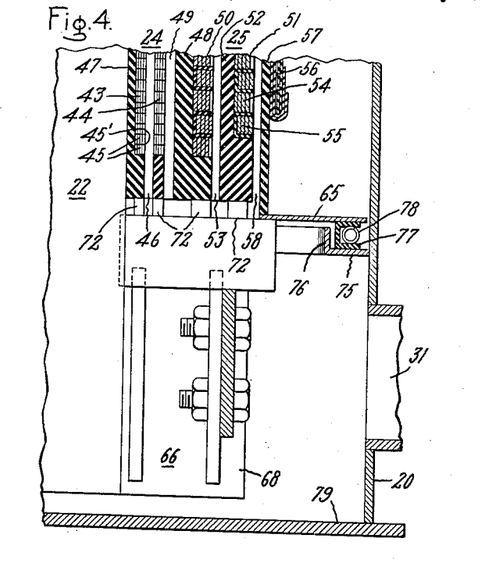
Fig. 4 is a sectional side elevation of a portion of the transformer illustrated in Fig. 3, showing winding ducts, coil supporting, and fluid directing structure at one end, or the lower end.

The winding structure through which the fluid may be forced includes the low voltage winding 24 having concentric barrels or windings 43 and 44 which surround the winding leg 22, as will be seen more particularly in Figs. 3 and 4. Each of the windings may have a plurality of axially disposed coils 45 each having any suitable construction, such as including a plurality of concentrically or radially disposed turns with insulation 45' between adjacent surfaces. The windings are spaced by suitable spacers to provide an axially extending duct 46, and in circulating a cooling fluid through the duct it will flow over the outer axial surface of only the outer turn of each coil to conduct heat therefrom. The idea of disposing a duct between adjacent turns or parallel connected strands of adjacent coils of a winding with solid insulation closely adjacent or in intimate contact with the inside and outside surfaces of the winding is described and claimed in my copending application Serial No. 443,309, filed concurrently herewith, and which is assigned to the same assignee as this present invention. The windings may be wound around a suitable insulating cylinder 47 which surrounds the winding leg 22. An insulating cylinder 48 surrounds the low voltage winding and is spaced therefrom to provide a duct 49. Around the cylinder 48 may be placed the high voltage winding 25 having any suitable construction, and in the arrangement illustrated in the drawings I have illustrated two barrel windings 50 and 51, the winding 50 being wound on the cylinder 48 and the winding 51 being wound on a concentric cylinder 52.

In order to provide an axially extending duct through the high voltage windings, the winding 50 is suitably spaced from the cylinder 52 by suitable spacers so as to provide a duct 53. The high voltage barrel windings 50 and 51 may have any suitable construction and in the arrangement illustrated in the drawings they include a plurality of axially disposed coils 54 and 55, the coils 55 being wound from the inside out in a U-shaped spacer and the adjacent coils 54 being wound from the inside out and then reshuffled so that the turns progress inwardly from the outside in. This construction along with an improved spacer is described and claimed in my copending application Serial No. 441,782, filed May 5, 1942, and which is assigned to the same assignee as my present invention. A suitable high voltage shield 56 is provided around the high voltage winding, the shield being supported by a cylinder 57 which may be spaced from the outer high voltage winding so as to provide an additional axially extending duct 58.

Around the winding leg 23, see Fig. 3, I also provide a low voltage winding including a pair of concentric barrels 60 and 61 and a high voltage winding including barrel windings 62 and 63. These windings may also be provided with ducts similar to those described in relation to the windings surrounding the winding leg 22. The connections between the various concentric high and low voltage windings around each leg will be described below in relation to the description of Fig. 14.

Figure 5:
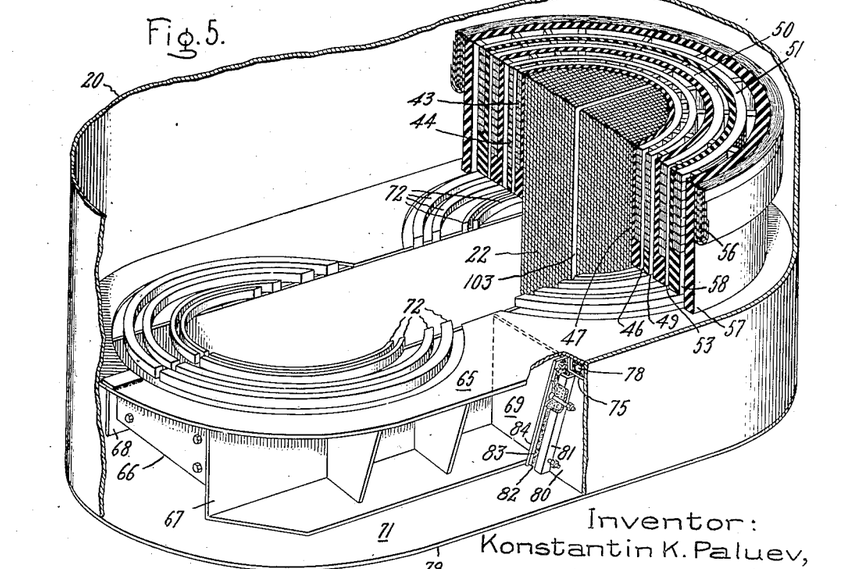
Fig. 5 is a perspective view in partial section of a portion of the structure illustrated in Fig. 3 showing the lower core clamp and coil supporting structure.

In order to direct the insulating fluid which enters the transformer casing through the intake port 31 into the ducts between the windings which surround the winding leg 22, I provide a suitable barrier arrangement 65 which prevents fluid from passing up through the space between the shield and casing. The barrier 65 may include any suitable construction and in the arrangement illustrated in the drawings it is provided by a portion of a diaphragm which extends from or forms a portion of a core clamping structure 66. As will be seen more clearly in Fig. 5, the clamping structure 66 includes a pair of spaced angle bars 67 and 68 between which the lower ends of the laminations which make up the winding legs 22 and 23 are supported. Since the transformer structure illustrated in the drawing includes two winding legs, the clamping structure is provided to accommodate the ends of the laminations of two winding legs. However, it is to be understood that my invention may be employed with a transformer having any suitable number of winding legs. Laminations forming yoke portions are also supported between the angle bars 67 and 68. Partitions 69 extend from the central portion of the angle bars 67 and 68 so that the radial extending diaphragm 65 with the axial extending partition 69 forms with the cooperating surfaces of the tank structure a plurality of chambers 70 and 71. A partition similar to that shown in Fig. 5 is provided on the opposite side. These chambers 70 and 71 in turn lead to the ducts surrounding the winding legs 22 and 23, respectively and their purpose will be described below.

As will be seen in Fig. 5, in order to support the windings, the diaphragm 65 is provided with portions below the winding legs 22 and 23 including a plurality of ring portions 72 between which are provided openings which communicate with the various ducts between the windings. All the ducts which surround winding legs 22 and 23 communicate with a passage or compartment 73 which is above the barrier 65, see Fig. 3, through radially extending ducts 74 provided in the winding end insulation. This end insulation will be described below in relation to Fig. 14.

Upon operation of the pump 26, the circulation of fluid, as shown by the arrows in Fig. 3, may be traced as follows: The fluid will be circulated through the intake port 31 and due to the barrier 65 and the compartment partitions 69, the fluid will be directed up through the various ducts which are in the high and low voltage windings which surround the winding leg 22. The fluid will then pass out through the ducts 74 of the winding leg 22 into the compartment 73, and into the ducts 74' of the winding leg 23 and through the ducts which are within the windings which surround the winding leg 23. The fluid will then pass into the chamber 71 and out through the exhaust opening 27 and through the pump and cooler 30. With such a construction all the fluid is directed through the group of ducts which surround the winding legs 22 and 23 in series. In this manner the forced fluid is passed through the ducts at a much faster rate than it would be if the same amount of fluid were circulated through the groups of ducts surrounding the winding legs in parallel. With such a construction the fluid passes through the ducts at a maximum rate for a given total quantity of fluid so that the temperature rise in the windings is maintained at a minimum value, since the rate of transfer of heat from a heated surface to a flowing fluid is increased with an increased rate of velocity of fluid flow.

In order to provide an arrangement for obtaining relatively tight seals between the cooperating surfaces of the diaphragm 65 and the partition 69 and the tank, I provide suitable gaskets which will be effective merely upon the lowering of the core and coil structure with the brackets 67 and 68 in place in the transformer casing 20. As will be seen in Fig. 4, a gasket for providing a relatively tight seal between the periphery of the diaphragm 65 and the adjacent surface of the tank 20 includes an inwardly extending shoulder portion 75 and a right angularly extending portion 76. Within this portion I have provided a channel member 77 made of any suitable insulating material, and a coil spring 78 which has a helical cross section and is circular so as to surround the entire periphery of the channel member 77. Thus, when the core and coil structure is lowered into the transformer casing 20, the channel member is so positioned with respect to the bottom 79 of the tank structure that as the core and coil structure is firmly supported on the bottom of the clamp structure 67 and 68, the insulating material 77 will be forced a small amount toward the collar portion 75 thereby compressing the spring 78 to provide a relatively tight joint between the channel portion and the copoerating surfaces of the shoulder 75 and the diaphragm 65.

A relatively tight joint may be provided between the partition 69 and a cooperating portion 80 which extends inwardly from the tank wall toward the partition 69, by a seal which includes a channel member 81 which is integral with the partition portion 80 of the side wall. A gasket 82 is supported in the U-shaped channel 81 and a plate 83 is supported by the U-shaped channel 81 against the gasket 82. The plate 83 is designed for limited movement toward and away from the channel member 81 so that when a cooperating plate 84 which is integral with the partition 69 pushes against the plate 83 a relatively tight joint will be formed between the plates 83 and 84 due to the resiliency of the gasket material 82.

Figure 6:
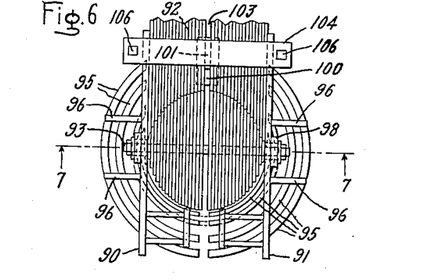
Fig. 6 is an end view of the upper or second end of one of the core legs of the structure illustrated in Fig. 3, showing the coil supporting structure.
Figure 7:
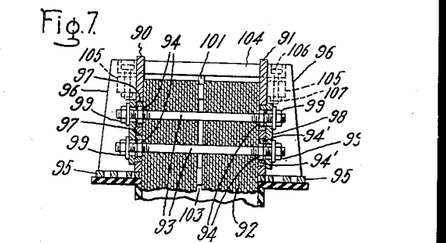
Fig. 7 is a sectional side elevation taken along the lines 7—7 of Fig. 6.

In order to clamp the core structure and support the windings at the upper or second end of the apparatus structure, I provide a pair of clamp members 90 and 91, see Fig. 6, which are placed on either side of the laminations forming the yoke portions 92 over the winding leg 22. The laminations 92 are rigidly attached together by a pair of bolt members 93, see Fig. 7, which extend through aligned openings in the laminations 92 and have nuts 94 at either end for tightly clamping the laminations. The clamp or plate members 90 and 91 may then be forced downwardly against the upper ends of the windings so as to rigidly clamp or support the windings between the ring members 72 of the lower coil structure and ring members 95 which are rigidly attached to the plate members 90 and 91 through webs 96. The plate members 90 and 91 have elongated slots 97, see Figs. 3 and 7, for accommodating the nuts 94 and so as to allow limited movement of the plates 90 and 91 after the bolts and nuts are made tight. The plate members 90 and 91 may be held in this position by inserting plugs 94' between the nuts 94 and the top and bottom surfaces of the slots 97. Plates 98 are then placed over the slots 97, the plates having openings for accommodating ends of the bolts 93. In order to hold the plugs 94' in place and hold the plate members 90 and 91 rigidly against the upper ends of the windings, nuts 99 may be tightly screwed on the extensions of the bolts 93, the nuts abutting against the plates 98.

In order to support that portion of the coils which are underneath the yoke portions 92, I provide a foot member 100, see Fig. 3, for abutting against the winding ends. The foot member 100 has a tongue portion 101 which extends up through a slot 103, see Fig. 6, in the yoke lamination structure 92. A transversely extending bar 104 abuts against the upper surface of the tongue portion 101. In order to pull the bar 104 toward the windings and thereby force the tongue 101 with its foot member 100 against the windings, I provide block members 105 which are rigidly attached to the plates 90 and 91. The block members 105 and the bar member 104 have aligned openings for the reception of bolts 106. Nuts 107 are then screwed on the ends of the bolts 106, and it will be seen that both ends of the bar member 104 are forced downwardly towards the ends of the winding structure, thus forcing the foot member 100 against the windings. A core and coil clamping and supporting structure is also placed above the winding leg 23 which is similar to that described above.

Figure 8:
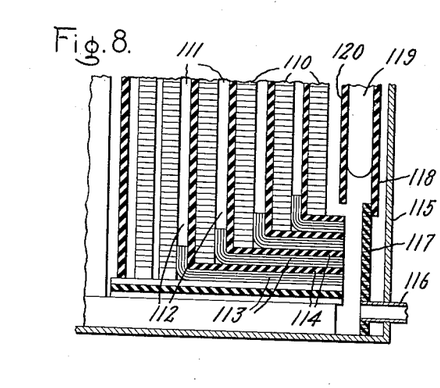
Fig. 8 is a sectional side elevation of a portion of a transformer structure illustrating a modification of the fluid directing arrangement of Fig. 3.

In Fig. 8 I have illustrated a modification of the arrangement described above for directing the flow of an insulating or cooling fluid into the several ducts between the windings. A plurality of concentric windings 110 are spaced by spacers 111 providing axially extending ducts 112.

At the ends of the windings there are provided radially extending ducts which communicate with the axial extending ducts. These radial extending ducts may be formed in any suitable manner such as by splitting the ends 113 of the spacers 111 which form the axial ducts as is shown at 112. Upon splitting the ends 113 they may be bent over so as to form ducts between suitable insulating members 114 which may be the flanged ends of cylinders upon which the windings are wound. The dielectric fluid may then be forced into the casing 115 through an opening 116, and in order to direct the fluid into the axially extending ducts I provide a barrier 117 which cooperates with an insulating cylinder 118 for preventing the flow of the dielectric fluid up through the space between the electrostatic shield 119 and the casing. The cylinder 118 may, therefore, be a part of the insulating structure of the shield 119. Another cylinder 120 may be provided inside the shield 119, the cylinder being spaced from the outer winding layer 110 so as to provide a duct between the outer winding layer and the electrostatic shield 119.

Figures 9, 10:
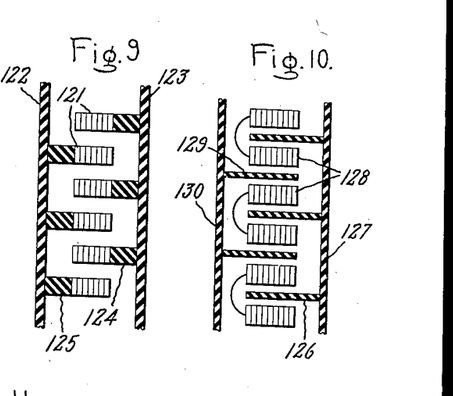
Figs. 9 and 10 illustrate modifications of the coil and duct system shown in Figs. 3, 4 and 5.

In Fig. 9 I have illustrated a disk coil winding having a plurality of axially spaced turns 121 between concentric cylinders 122 and 123. In order that the fluid which flows through the space between the winding space may wash a major portion of the winding surface, I provide a zig-zag path which is obtained by providing spacers 124 between every other winding 121 and the cylinder 123. Spacers 125 are also placed between the cylinder 122 and the windings adjacent those which are spaced by the spacers 124. Thus a zig-zag path is provided. Another arrangement for providing a zig-zag path, as illustrated in Fig. 10, includes insulating collars or washers 126 which extend inwardly from a cylinder 127 between coils 128, and collars 129 which extend outwardly from a cylinder 130 on the opposite sides of the coils from the collars 126.

Figure 11:
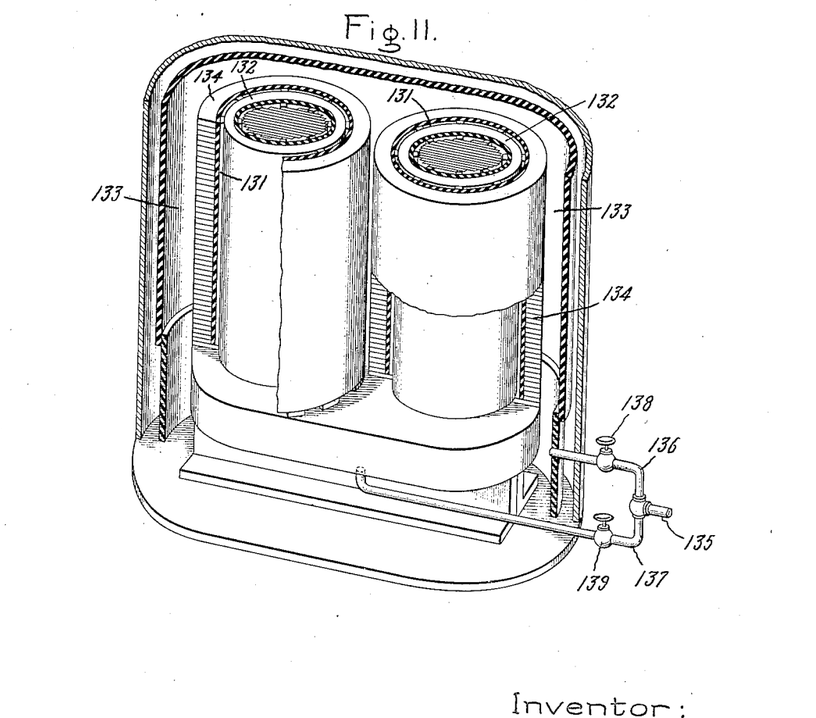
Fig. 11 is a perspective view in partial section of a transformer illustrating a modification of the fluid directing structure of Figs. 3 and 8.

In Fig. 11 I have illustrated an arrangement for selectively controlling the rate of flow of an insulating fluid between parallel ducts. The structure includes ducts 131 around one winding, such as a low voltage winding 132 and ducts 133 around another winding, such as a high voltage winding 134. An insulating fluid may then be circulated through the separate duct system from a common source through a pipe 135. One branch pipe 136 then communicates to the lower end of the ducts 133 while a pipe 137 communicates to the lower end of the ducts 131 around the low voltage winding. Valves 138 and 139 are placed in the pipes 136 and 137, respectively, and by varying the setting of the valves, the amount of fluid which flows through the parallel duct system may be selectively controlled.

Figure 12:
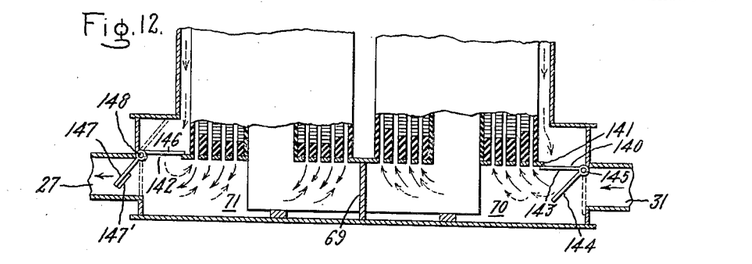
Fig. 12 is a side elevation in partial section and partially diagrammatic of the lower end of the transformer of Fig. 3, illustrating a modification of the fluid directing structure.

In the structures which have been described above barriers have been placed between the lower ends of the windings and the casing or shield for directing the flow of the insulating fluid through the ducts and preventing the fluid from passing through the space between the outside of the winding or electrostatic shield and the inside of the casing. By such a construction a maximum amount of heat may be carried away from the winding conductors while the fluid is being forced through the ducts. However, in order to allow the insulating fluid in the tank to circulate due to natural convection currents, such as during light loads or when the pressure which forces the dielectric fluid through the transformer construction fails, I provide an openable port 140 in a barrier 141, as may be seen in Fig. 12, which illustrates somewhat diagrammatically a construction similar to that of Figs. 3, 4, and 5, the barrier 141 accomplishing the same function as the diaphragm 65. Since the barrier 69 divides the lower end of the casing into chambers 70 and 71, the diaphragm 141 is provided with a similar closable opening 142 communicating with the chamber 71. The opening 140 may be held in any suitable condition, such as normally closed by a valve 143, the operation of which may be controlled in any suitable manner, such as being held against the lower surface of the opening 140 by the force of the incoming fluid against a pilot vane 144. The valve 143 and vane 144 are rotatably mounted on a shaft 145 and when the force of the incoming fluid through the pipe 31 stops, the valve and vane assembly will drop to the dotted line position due to the force of gravity and thus open the port 140. The fluid in the tank may then circulate, as shown by the dotted arrows, up through the ducts and down through the space between the windings and the casing, the full line arrows indicating the flow when the pump is in operation. Since the fluid circulates out through a pipe 27, a similar valve and vane arrangement including a valve 146 is provided which cooperates with the upper portion of the opening 142, the operation of which may be controlled in any suitable manner such as by a pilot vane 147 which is held in the solid line position shown in Fig. 12 by the force of the outgoing fluid. However, upon cessation of the movement of the insulating fluid the vane 146, due to any suitable biasing force, such as that of a counter weight 147', will move around a pivot point 148 and thus raise the valve 146 and open the opening 142. Thus the insulating fluid may circulate as shown by the dotted arrows up through the ducts and down through the space between the winding legs and the casing, the full line arrows showing the direction of forced fluid flow.

Figure 13:
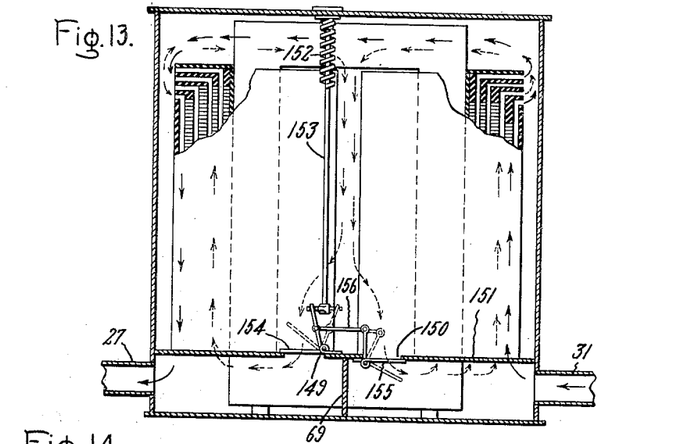
Fig. 13 is a side elevation in partial section and partially diagrammatic of the transformer of Fig. 3, illustrating a further modification of the fluid directing system.

In Fig. 13 I have illustrated another arrangement for opening ports 149 and 150 in a diaphragm 151, the ports being on both sides of the partition 69. Upon cessation of the flow of the insulating fluid continued operation of the transformer will cause the temperature to rise particularly in the upper portion of the casing. I have, therefore, provided a bimetallic element 152 which is attached to a rod 153. The rod is in turn attached to valve members 154 and 155 through a suitable linkage mechanism 156. The bimetallic element is so attached to the rod 153 that upon heating it will move and operate the linkage mechanism to the dotted line position as illustrated in Fig. 13 and, therefore, open the ports. The fluid may then circulate as shown by the dotted line arrows due to natural convection currents.

Figure 14:
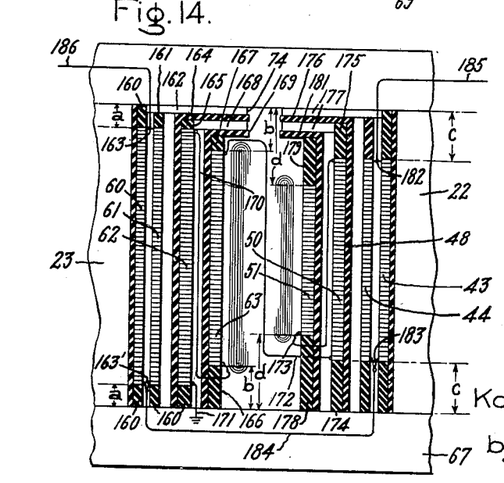
Fig. 14 is a sectional side elevation partially diagrammatic of the transformer of Fig. 3, illustrating the relationship between the windings, duct structure, and coil supporting arrangements.

In the apparatus described above it is so designed as to bring about structural harmony between the various parts. By this is meant an improvement in the structure from a mechanical point of view also contributes to the thermal and electrical efficiencies of the resulting structure, etc. This is brought out in Fig. 14 which somewhat diagrammatically illustrates the insulated windings of the structure of Figs. 3 to 7. The low voltage winding 60 is provided with insulation 160 at either end of the winding which insulations have similar thicknesses, as is indicated by the letter $a$. The lower end of the winding 61 also has insulation 160, and the upper end of the low voltage winding 61 has insulation in the form of a collar 161 and spacers 162 providing the radially extending ducts 74 which communicate with the axially extending ducts between the windings 60 and 61. The total thickness of the collar 161 and spacers 162 is also equal to $a$. Since the top and bottom coils of the low voltage windings 60 and 61 are connected together by crossovers 163 and 163' respectively, the insulation at the top and bottom of the two windings may be of the same thickness, $a$. In this manner an insulation distance at the top end of the winding 61 is provided which is similar to the distance $a$, but the insulation thickness includes solid insulation 162 and insulation in the form of ducts having a fluid dielectric and spacers. Thus for magnetic symmetry the upper and lower ends of both low voltage windings have the same thickness of insulation and the upper end of the outer winding 61 has an insulation with suitable ducts as part of the insulation.

The inner high voltage winding 62 also has insulation 160 in the form of a collar between the lower end and the lower core clamp. The upper end insulation includes the spacers 162, a flanged end 164 of the cylinder upon which the winding 62 is wound and insulation 165. The sum of the thicknesses of the various insulation at the upper end of the winding 62 is also equal to $a$. The outer high voltage winding 63 has insulation 166 at its lower end equal to a distance $b$. In determining the required thickness of the insulation at the top and bottom of any winding for any given voltages at the top and bottom, the amount of insulation necessary may be computed, given the dielectric strength per unit of axial length for the insulation to be used at each end. The end requiring the greater thickness may then be used as a measure of the thickness for the other end. The upper end of the winding 63 is insulated from the upper core clamp by insulation which includes a collar 167, spacers 168 forming a radially extending duct which leads to the axial ducts and flanged collars 164 and 169 of the winding cylinders. The sum of these thicknesses is also equal to the distance $b$ so as to contribute to the magnetic symmetry of the construction. The thickness of the insulation at the ends of the winding 63 is, however, thicker than the distance $a$ since the upper coil of the winding 62 is connected to the lower end of the winding 63 so that the upper end of the winding 63 will be at a higher potential than the upper end of the winding 62. This connection may be made through a crossover 170. The lower end of the winding 62 may be connected to ground through a lead 171. It will be seen that for both the windings 62 and 63 the upper ends of the windings are respectively at a higher voltage than the lower ends of the windings. The upper composite insulation, however, has a higher dielectric strength per unit of axial length than the lower due to the greater creepage length and the fact that part of this length is over edges of insulating flanges. In the construction illustrated in Fig. 14 the upper end of the winding 63 is connected to the lower end of the inner high voltage winding 50 around the leg 22 through a crossover 172. The upper end of the winding 50 is connected to the lower end of the winding 51 through a crossover 173, and the upper end of the winding 51 may be connected to a suitable high voltage line. Insulation at the lower end of the winding 50 is provided by an insulating collar 174, and the insulation at the upper end of the winding 50 is provided by an insulating collar 175 and by a flange 176 which is integral with the cylinder 48 upon which the winding 50 is wound. Spacers 177 are provided for providing the ducts 74 which communicate with the ducts which surround the low voltage windings 43 and 44. Since the upper end of the winding 50 will be relatively at a higher potential than the lower end of the winding 50 and the upper end of the winding 63, the thickness of the insulation indicated by the letter $c$ will be greater than $b$. For magnetic symmetry, however, the thickness of the insulation 174 is also equal to $c$. The lower end of the winding 51 will have suitable insulation 178 and the upper end will have insulation including a collar 179, integral flanges 176 and 181 of the cylinders upon which the windings 50 and 51 are wound and spacers 177 between the flanges which provide the ducts 74. Since the upper end of the winding 51 is at a higher potential than the upper end of the winding 50, the thickness of insulation $d$ will be a greater thickness than that indicated by the letter $c$. For magnetic symmetry, however, the thickness of the insulation 178 will also be equal to $d$. The insulation around the low voltage windings 43 and 44 is also equal to $c$ which is the thickness of the insulation of the adjacent high voltage winding, in order to carry out the magnetic symmetry so as to take care of short circuit forces. The upper and lower ends of the low voltage windings 43 and 44 may be connected together through crossovers 182 and 183, respectively, and the crossovers 163 and 163' of the low voltage windings around each leg may be connected together by a conductor 184. The top ends of the winding pairs 43, 44, and 60, 61 may be connected to any suitable external lines through conductors 185 and 186, respectively.

Although I have shown and described particular embodiments of my invention, I do not desire to be limited to the particular embodiments described, and I intend in the appended claims to cover all modifications which come within the spirit and scope of my invention.

What I claim as new and desire to secure by Letters Patent of the United States is:

1. In an electric induction apparatus, a winding having a plurality of axially disposed coils, insulating means between adjacent surfaces of said axially disposed coils, each of said coils having a plurality of radially disposed turns, a casing enclosing said coils, and means for circulating an insulating fluid over the outer axial surface of only the outer turn of each of said coils so as to conduct heat from said turns.

2. In an electric induction apparatus, a core having a winding leg, a winding having a plurality of axially disposed coils surrounding said leg, insulating means filling the space between adjacent surfaces of said coils, each of said coils having a plurality of radially disposed turns, a casing enclosing said core and coils, and means for circulating an insulating fluid over the outer axial surface of only the outer turn of each of said coils so as to conduct heat from each of said turns.

3. In an electric induction apparatus, an enclosing casing, a winding having a duct, pump means for forcing an insulating fluid through said duct, means including barrier means between said winding and said casing for directing the flow of the fluid through said duct, said barrier means having openable port means, and means responsive to the cessation of the forcing of the flow of fluid for opening said port means so as to allow the fluid to flow by convection up through the duct and down between said winding and said casing and through said port means.

4. In an electric induction apparatus, an enclosing casing, a winding having a duct, pump means for forcing an insulating fluid through said duct, means including barrier means between said winding and said casing for directing the flow of fluid through said duct, said barrier means having openable port means, and a damper control means responsive to the cessation of the forcing of the fluid by said pump for opening said port means so as to allow the fluid to flow by convection up through the duct and down between said winding and said casing and through said port means.

5. In an electric induction apparatus, an enclosing casing, a winding having a duct, pump means for forcing an insulating fluid through said duct, means including barrier means between said winding and said casing for directing the flow of the fluid through said duct, said barrier means having openable port means, and thermal responsive means operably connected to said port means for opening said port means upon the attainment of a predetermined temperature condition within said casing.

6. In an electric apparatus, a plurality of winding legs, windings having a plurality of axially disposed ducts surrounding each of said legs, an enclosing casing, said casing having intake and exhaust ports, pump means connected to said ports for circulating a dielectric fluid, barrier means between said windings and said casing at one end of said windings for directing the flow of fluid through said ducts, said barrier means having closable passages in that portion of the barrier between said windings and said casing, and means responsive to the interruption of the forced circulation of the fluid for opening said closable passage means for allowing the circulation of the dielectric fluid in said casing by natural convection up through said ducts and down the space between said winding and said casing and through said passage means.

7. In an electric induction apparatus, a plurality of concentric windings, means spacing said windings providing an axial duct, winding support means at the bottom of said windings having an opening connected to said duct, clamp means at the top of said windings, means for connecting the top end of one of said windings to the bottom end of the adjacent of said windings for serially connecting said windings together, insulating means between said winding ends and said clamp and support means, said insulating means having a radially extending duct connected with said axial duct, the thickness of said insulation at one end of each of said windings being similar to the thickness of said insulation at the other end of each of said windings so as to balance the electrical characteristics of said windings, the thickness of said insulation at the ends of said second winding being greater than that at the ends of said first winding by an amount proportional to the differences in the voltages at the top ends of said windings during operation of said apparatus.

8. In an electric induction apparatus, a core having a pair of winding legs, a winding having a plurality of concentric barrel windings surrounding said winding legs, each of said barrels including a plurality of axially disposed coils, spacer means between said concentric barrel windings providing a group of concentric ducts between said adjacent barrel windings for each of said windings, a substantially enclosing casing, a fluid dielectric within said casing, pump means for forcing the circulation of said fluid through said casing, and means for directing all the circulating fluid through said group of ducts of each of said winding legs in series so that all the circulating fluid flows through each of said groups.

9. In an electric induction apparatus, a core having a plurality of winding legs, windings surrounding each of said winding legs, an enclosing casing, a fluid dielectric within said casing, a radially disposed diaphragm adjacent the ends of said windings at one end of said casing, means for providing a relatively fluid-tight seal between the surface near the periphery of said diaphragm and the adjacent surface of said enclosing casing, an axially disposed barrier between an end of said casing and said diaphragm dividing the space between said ends of said winding and said end of said casing into a plurality of compartments, an intake port communicating with one compartment, an exhaust port communicating with another compartment, and passages in said diaphragm communicating between said compartments and the winding space, and means for circulating said fluid from said intake compartment through said winding space to said exhaust compartment.

10. In an electric induction apparatus, an enclosing casing, a core and coil structure removable as a unit from said casing and having a clamp at one end adapted to be supported by said casing, said clamp having radially and axially disposed partitions adapted to provide with the surfaces of said casing a plurality of fluid compartments, and gasket means on the portions of said casing adjacent the cooperating surfaces of said partitions forming a relatively tight seal between said cooperating surfaces when said coil and core structure is lowered into said casing.

11. In an electric induction apparatus, a core having a plurality of winding legs, windings including a plurality of concentric barrel windings surrounding said legs, each of said windings including a plurality of axially disposed coils each having a plurality of radially disposed turns, spacer means between said concentric barrel windings providing concentric ducts between said adjacent barrel windings, an enclosing casing, a fluid dielectric within said casing, a radially disposed diaphragm adjacent the ends of said winding at one end of said casing, means for providing a relatively fluid-tight seal between the surface near the periphery of said diaphragm and the adjacent surface of said enclosing casing, an axially disposed barrier between an end of said casing and said diaphragm dividing the space between said ends of said winding and said end of said casing into a plurality of compartments, an intake port communicating with one compartment, an exhaust port communicating with the other compartment, each of said compartments communicating with the ducts of said adjacent winding, and means connecting the ends of the ducts at the opposite end of said casing so that fluid may circulate through one of said compartments, through the ducts of one winding, and then through the ducts of the other winding to said other compartment.

12. In an electric induction apparatus, a core having a winding leg and yoke portions, a winding having a plurality of axially disposed coils around said leg, core clamp means at the ends of said leg, coil supporting means at one end of said winding including a pair of members adjustable with respect to said core clamp means and adapted to bear on the adjacent end of said winding, said yoke member having a slot extending therethrough, and a member having a foot adapted to bear on the portion of said winding under said yoke and a tongue portion extending through said yoke slot, and means cooperable with said tongue and said core clamp for adjustably tightening said foot against said winding.

13. In an electric induction apparatus, an enclosing casing, a core and coil structure removable as a unit from said casing, core clamp means at one end of said core, said clamp means having substantially radially and axially disposed partitions, partition means extending from the inner surface of said casing adjacent said axially and radially disposed partitions so as to provide with adjacent cooperating surfaces a plurality of fluid compartments, and gasket means between said axially and radially disposed partitions and the partition means of said casing forming a relatively fluid tight seal between the cooperating surfaces thereof when said core and coil structure is lowered into said casing.

14. In an electric induction apparatus, an enclosing casing, a winding having a duct, said winding being spaced from the side walls of said casing, an insulating fluid in said casing, cooler means connected to said casing, pump means for forcing the insulating fluid through said duct and cooler, means including barrier means between said winding and said casing for directing the flow of the fluid through said duct, said barrier means having port means for permitting the flow of the fluid by convection upon cessation of the forcing of the fluid flow through said duct, between said barrier means and said casing and through said port means so as to use a major portion of the fluid in said casing to cool said winding.

15. In an electric induction apparatus, an enclosing casing, a winding having a duct, said winding being spaced from the side walls of said casing, an insulating fluid in said casing, cooler means connected to said casing, pump means for forcing the insulating fluid through said duct and cooler, means including barrier means extending from the lower end of said winding toward said casing for directing the flow of the fluid through said duct and for substantially preventing the fluid from flowing into the space between said winding and said casing during forcing of the fluid by the pump, said barrier means having port means for permitting the flow of fluid by free convection upon cessation of the forcing of the fluid flow through said duct, between said winding and said casing and through said port means so as to use a major portion of the fluid in the casing to cool said winding.

16. In an electric induction apparatus, a core having a plurality of winding legs, windings including a plurality of axially disposed coils surrounding said legs, each of said coils having a plurality of radially disposed turns, an enclosing casing, a fluid dielectric within said casing, means providing ducts adjacent said windings so that fluid may circulate over the outer axial surface of the outer turns of the coils, core clamp and coil support means adjacent opposite ends of said windings, insulating means between said coil support means and the adjacent ends of said windings, said insulating means having ducts communicating with said winding ducts, the thickness of said insulating means at one end of each of said windings being substantially similar to the thickness of said insulation at the other end of said winding, cooler means connected to said casing, pump means for forcing the insulating fluid through said ducts and cooler, and means including barrier means for directing all the circulating fluid through said ducts of each of said windings in series so that all the circulating fluid flows through the ducts of each winding.

KONSTANTIN K. PALUEV.